United States Patent [19]

Kaye

[11] 4,434,683

[45] Mar. 6, 1984

[54] SAW-ADVANCING MEANS WITH EDGE ENGAGING PAD

[75] Inventor: Peter D. Kaye, Monroe, Oreg.

[73] Assignee: Bell Industries, Inc., Los Angeles, Calif.

[21] Appl. No.: 365,621

[22] Filed: Apr. 5, 1982

[51] Int. Cl.³ .............................................. B23D 63/14
[52] U.S. Cl. .......................................... 76/37; 76/77;
51/216 ND; 51/225
[58] Field of Search .................... 76/79, 77, 78 R, 75,
76/37, 40, 41; 51/225, 216 ND

[56] References Cited

U.S. PATENT DOCUMENTS

| | | | |
|---|---|---|---|
| 3,304,660 | 2/1967 | Bindszus | 51/225 |
| 3,952,616 | 4/1976 | Varley | 51/216 ND |
| 4,018,109 | 4/1977 | Stier | 76/77 |
| 4,102,223 | 7/1978 | Robinson et al. | 76/37 |
| 4,102,224 | 7/1978 | Wright | 76/79 |

Primary Examiner—Roscoe V. Parker
Attorney, Agent, or Firm—Kolisch, Hartwell & Dickinson

[57] ABSTRACT

Saw-advancing apparatus in a grinder for circular saws which includes a pad brought into engagement with the edge of the saw by extension of a fluid-operated ram. The pad and ram are swung as a unit to produce rotation of a saw engaged by the pad.

10 Claims, 3 Drawing Figures

SAW-ADVANCING MEANS WITH EDGE ENGAGING PAD

BACKGROUND AND SUMMARY OF THE INVENTION

This invention relates to saw grinding apparatus, and more particularly to grinders for circular saws where the saw is moved incrementally to place successive teeth in a grinding station where the grinding operation is performed.

Circular saws have widely different sizes, and widely different teeth configurations, sizes, and spacings around the perimeter or edge of the saw. As a consequence, any means in a grinder employed to advance successive teeth into the grinding station, for optimum ease of operation and versatility, should accommodate the grinding of saws of different sizes, teeth configurations and spacings, with minimal adjustments required in the grinding machine. Furthermore, when adjustments are necessary in setting up a grinding machine for a different type of saw, convenience dictates that the adjustments be easily and rapidly made. Advancing mechanisms which rely on gripping opposite faces of the saw blade pose certain problems in the handling of circular saws with cutting or scrapping instrumentalities mounted in the blade inwardly from the periphery of the saw. Reliability, and obtaining accurate positioning of successive teeth in the grinding station of a grinder, obviously are important. Optimally, devices provided for advancing a saw in a grinder should lend themselves to automatic control.

A general object of the invention is to provide, in apparatus for grinding the teeth in a circular saw, improved means for advancing the saw to place successive teeth in the grinding station, which is flexible in operation, and capable of handling widely different sizes and configurations of saws.

Another object is to provide saw-advancing mechanism of the above general description which is readily adapted to be controlled automatically.

Yet another object of the invention is to provide such a saw-advancing mechanism which is reliable in operation and relatively maintenance free.

Where adjustments are required in the apparatus contemplated, to adapt the grinding machine for a different size of saw, such adjustments are quickly and rapidly made.

A further object of the invention is to provide saw-advancing mechanism for a grinding machine wherein advancing of the saw is by means of a pad which engages the edge of a saw and then rotates such to advance the saw. Side faces of the saw are not contacted.

Various other objects and advantages are attained by the invention, which is described hereinbelow in conjunction with the accompanying drawings, wherein:

BRIEF DESCRIPTION OF THE DRAWINGS

FIG. 3 is a view illustrating the top of a compressible pad which forms part of the means for advancing the saw.

DETETAILED DESCRIPTION OF THE INVENTION

Figure 1:
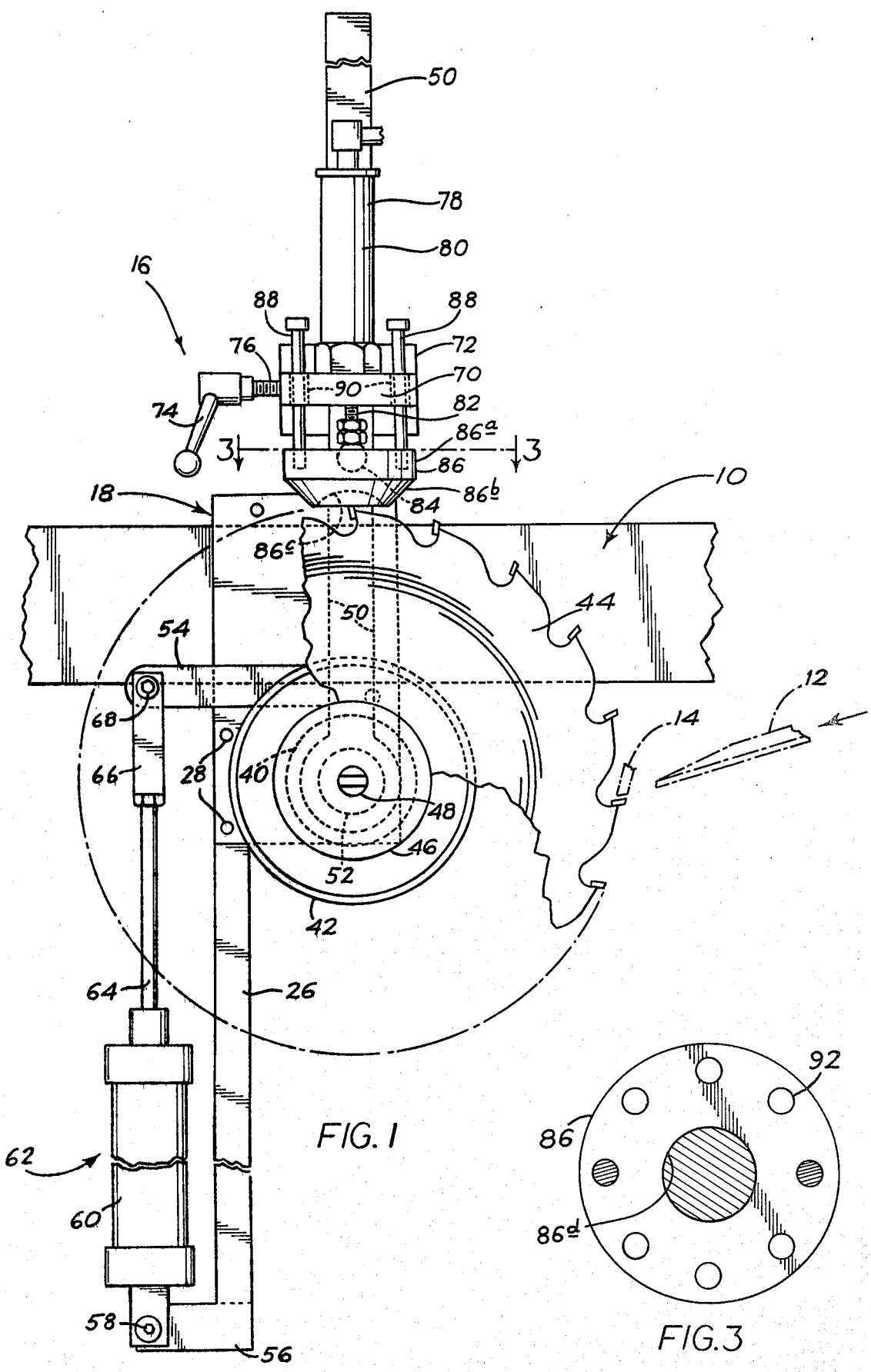
FIG. 1 is a side elevation view illustrates portions of a grinding machine, and in particular portions of a bar in the machine mounting an adjustable bracket assembly which supports the saw to be sharpened, and means for rotating the saw in increments whereby to advance successive teeth into a grinding station.

Referring now to the drawings for a more detailed description of the invention, illustrated in the drawings are portions of a grinding machine utilizable in grinding the teeth of a circular saw. The grinding machine or apparatus has the usual frame which includes an elongate bar 10 projecting outwardly from a grinding station in the apparatus. Properly supported in the frame of the machine is the usual power-driven grinding wheel arbor (not shown) which has a grinding wheel mounted on it, portions of which are shown in dot-dash outline at 12. Also part of the grinding machine is a movable indexing finger, portions of which are shown in dash-dot line at 14, which is moved toward the edge of a saw mounted in the apparatus to engage a tooth on such saw and properly position such tooth for grinding to be performed thereon. Having indexed the position of the tooth, the indexing finger moves away from the saw, and the grinding wheel may be moved in the direction of the arrow shown in FIG. 1 whereby it moves inwardly and across the cutting instrumentality of the saw tooth to grind it. The indexing finger and the grinding wheel are located at the grinding station of the grinding machine.

Indicated generally at 16 is means provided in the grinding machine for mounting a circular saw and for rotating such in increments to advance successive teeth into the grinding station and into a position indexed by the indexing finger 14.

Considering details of this mounting and advancing means, such includes a bracket assembly 18 mounted on bar 10 and adjustably positionable along the length of the bar. The bracket assembly includes a pair of opposed plates 20, 22 spaced apart from each other by means including space plate 24 and depending arm 26, and these various plate and the arm are secured together by means including fastener assemblies 28. Defined between opposed plates 20, 22 adjacent the top of the bracket assembly is a passage 30 of substantially rectangular cross section which has bar 10 extending through it. A handwheel 32 attached to a clamp screw 34 is turned to advance the inner end of the clamp screw firmly against bar 10 for the purpose of securing the bracket assembly in a given position of adjustment. With large diameter saws, the bracket assembly is loosened and adjusted along the length of bar 10 away from the grinding station. With smaller diameter saws, adjustment of the bracket assembly on the bar 10 is in the opposite direction.

Mounted adjacent the base of the bracket assembly and extending between plates 20, 22 is a fixed shaft 36. Mounted on the shaft with its axis coinciding with axis 38 of the shaft is a disk-shaped mounting plate 40. A circular saw is mounted on the mounting plate through a cup element 42, which has the back or base thereof resting against the mounting plate, and a peripheral edge 42a which has one side or face of the circular saw (such as the saw shown at 44) resting thereagainst. A conically shaped element 46 is mounted with such extending through the usual eye of the circular saw and with the outer surface thereof engaging the edge which defines this saw eye. Securing the conically shaped element and cup to mounting plate 40 is a fastener 48 extending through accommodating bores provided in the conically shaped element and cup element, and having an inner threaded end received within a suitable internally threaded bore extending axially in mounting plate 40. The structure described holds the saw with such rotatable on the outer surface of element 46, and constitutes a saw-mounting means for detachably mounting a saw with such being rotatable about its axis and such axis coinciding with axis 38 of shaft 36.

An elongate support arm 50 located intermediate mounting plate 40 and plate 22 of the bracket assembly extends upwardly from the location of shaft 36. Such is secured at its lower end to a sleeve 52 (see FIG. 1) which encircles shaft 36 and supports the arm on the shaft with the arm relatively rotatable about axis 38 of the shaft. Joined to the support arm at a region above sleeve 52, and extending laterally outwardly therefrom, is an actuating arm 54. The support arm and actuating arm may collectively be thought of as support structure in the apparatus mounted for relative rotation with respect to the axis about which the saw is rotatable.

Arm 26 has earlier been described which has its upper end secured between plates 20, 22. The arm extends downwardly from such plates, and through a foot 56 pivotally supports at 58 cylinder end 60 of a fluid-operated ram 62. The extendible or rod end 64 of the ram extends upwardly and through clevis 66 to a pivot connection 68 with the outer extremity of actuating arm 54. With such a construction, and on contraction of the ram, the support structure including arm 50 and arm 54 are caused to swing in a counterclockwise direction as the apparatus is viewed in FIG. 1.

A horizonal shelf member is shown at 70, and such is secured at one end to a plate 72 disposed against one side of support arm 50. Adjacent where joined to plate 72, the shelf member is notched (not shown) to receive support arm 50 where such extends up through the shelf member. A crank 74 joined to a screw 76 which is received in an internally threaded bore (not shown) in the shelf member is turned to clamp the shelf member at various heights relative to support arm 50.

Shown at 78 is a fluid-operated ram. The ram has its cylinder end 80 mounted on the shelf member. Rod end 82 of the ram extends downwardly through an accommodating bore in shelf member 70 and the threaded lower end of the rod has screwed thereon a ball member 84.

Illustrated at 86 is a pad element. Such may be made, for example, of a tough, stiff, slightly flexible material, such as a cast polyurethane block. By reason of such composition, the pad element is compressible and resilient and capable of deformation.

Figure 2:
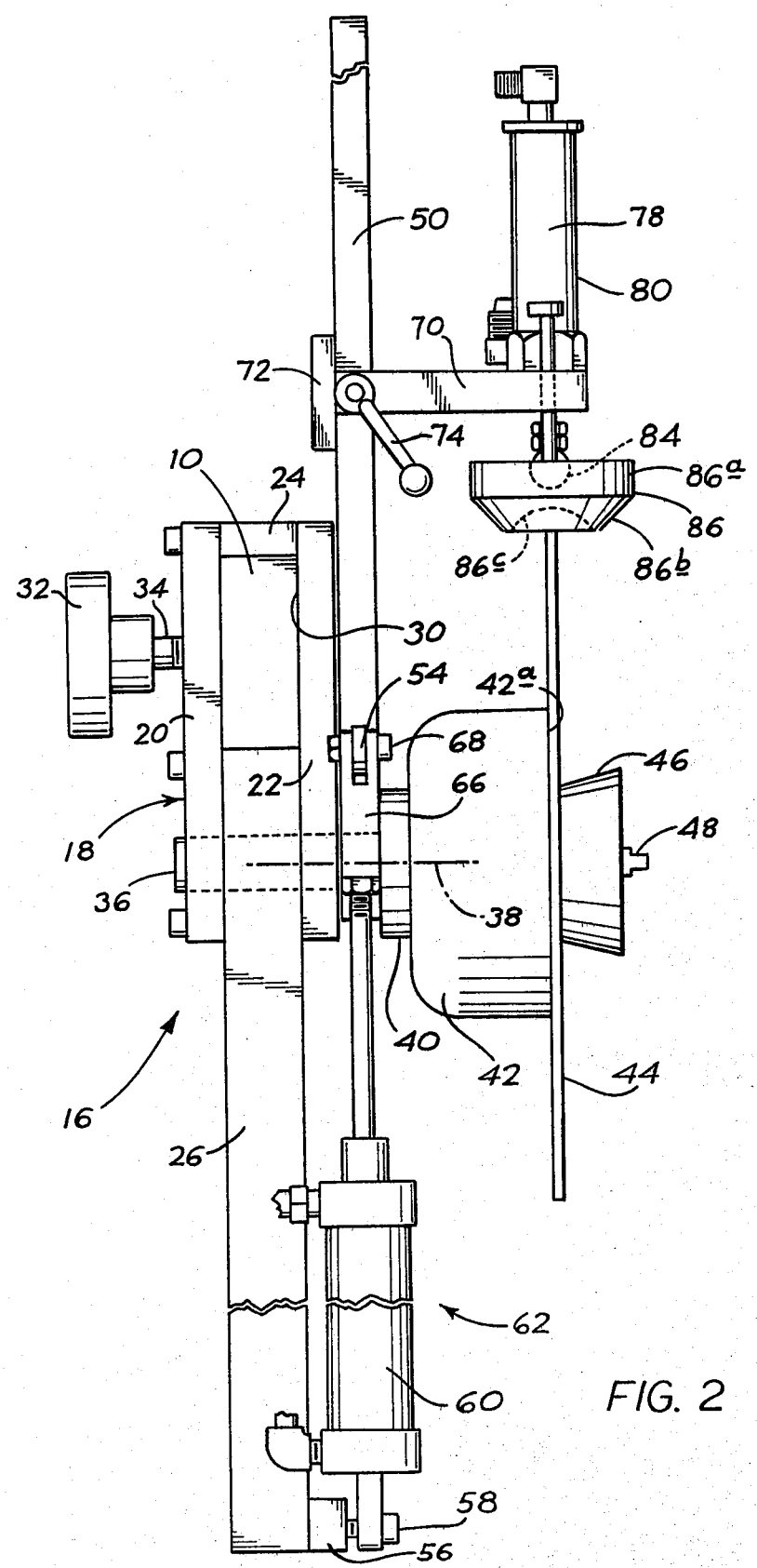
FIG. 2 is another side elevation view of the apparatus illustrated in FIG. 1, viewing the apparatus from left-to-right as shown in FIG. 1.

The pad element, as illustrated in FIGS. 1 and 2, has an upper portion 86a which is cylindrical in outline. Below such upper portion is a frusto-conical portion 86b. The bottom of the pad element is formed by a concave face 86c.

The pad element is mounted on the end of rod 82 by providing in the top thereof a cavity 86d (see FIG. 3). Such receives the ball of the ball member with a snap fit. When mounted, the ball member provides a swivel mounting which accommodates tilting of the face of the pad.

Pin 88 extending loosely down through bores 90 provided in the shelf member have bottom ends snugly seated within bores 92 (see FIG. 3) provided in the upper cylindrical portion of the compressible pad element. The pins inhibit rotataion of the pad about an upright axis extending through the ball member. The pins, however, do not restrain pivoting of the pad by reason of the looseness of the fit of the pins within bores 90 and the deformable nature of the pad element where such seats the lower ends of the pins.

Explaining the operation of the apparatus, during grinding of a tooth in the saw, the saw is held stationary by a clamp mechanism (not shown) while the grinding wheel 12 is advanced and retracted to produce a grind in the tooth. Ram 78 is contracted and the compressible pad element mounted on the rod end of the ram is spaced slightly from the periphery or edge of the saw.

After grinding of a tooth, the clamp mechanism for the saw is released and ram 78 extended to move the pad at the base of the ram into engagement with the periphery or edge of the saw. By reason of the tilting movement provided a pad element, and the configuration of the base of the pad element, a secure engagement with the saw edge is produced regardless of the particular portion of the saw edge with which the pad engages. After engaging the edge of the saw, ram 62 is contracted to cause the structure comprising arms 54 and 50 to rotate in a counterclockwise direction in FIG. 1. This produces rotation of the saw in the same direction, by reason of the engagement of the pad element with the edge of the saw.

Indexing finger 14, prior to the next tooth to be sharpened moving into the grinding station, moves into the path of the advancing tooth. Circular motion of the saw continues until the tooth to be sharpened comes up against the indexing finger, which prevents further movement. The saw is then ready to be clamped in position and ground. During such grinding, ram 78 is contracted to move the pad element away from the edge of the saw, and ram 62 extended to return the parts to their original positions.

After substantial use and should any wear occur in the face of the compressible pad element, it is a relatively simple matter to pull pins 88 so that their ends move away from seated positions in the pad. The pad element may then be rotated about ball 84 to place a different portion of the pad element directly above the edge of the saw. After such positioning, pins 88 may be reseated in another pair of bores 92 provided on diametrically opposite sides of the pad element.

The saw-advancing means described is capable of rotating a saw over a large angle each time ram 62 is actuated. As a result, saws with teeth closely or widely spaced about the periphery of the saw are handled with equal facility. Saws of differing diameters are readily handled, after making proper adjustments in the position of bracket assembly 18 and shelf member 70.

By including pressure-sensitive devices sensitive to the pressure of operating fluid in ram 62, a grinding machine provided with the advancing means described may be controlled to produce grinding of all the teeth in a saw automatically, with proper sequential movement of the advancing means, and the grinding wheel and indexing finger produced automatically.

While a particular embodiment of the invention has been described, variations and modifications are possible.

It is claimed and desired to secure as Letters Patent:
1. In apparatus for grinding the teeth in a circular saw:
   saw-mounted means for mounting the saw with said saw being rotatable about its axis, a compressible pad disposed radially outwardly of the periphery of a saw mounted on said saw-mounting means, and power-operated means for moving said pad radially inwardly against the periphery of said saw and in a path extending about the axis of the saw whereby the saw is rotated about its axis by said pad.

2. The apparatus of claim 1, wherein the pad has a face which is adapted to engage the periphery of a saw, and the pad is mounted through a swivel mounting which accommodates tilting of the face of the pad.

3. The apparatus of claim 1, wherein said power-operated means comprises a first fluid-operated ram which extends and contracts to shift the pad radially, and a second fluid-operated ram which extends and contracts to move the pad in an arcuate path.

4. The apparatus of claim 1, wherein the pad has a face which is adapted to engage the periphery of the saw, the face is concave, and the pad is adjustably mounted for adjustable movement about an axis extending through its face.

5. In apparatus for grinding the teeth in a circular saw:

saw-mounting means for mounting the saw with such rotatable about an axis coinciding with the axis of the saw, support structure rotatably mounted for movement about said axis, a pad for engaging the edge of a saw, a first powered means interposed between said support structure and pad actuatable to move said pad radially of a saw mounted in said saw-mounting means with such being toward and away from the edge of said saw, and a second powered means connected to said support structure actuatable to rotate the support structure and cause rotary movement of the saw with the pad engaging the edge of the saw.

6. The apparatus of claim 5, wherein the pad is compressible, and which further comprises a swivel mounting for the pad connecting it with said first powered means accommodating tilting of the pad when it engages the edge of the saw.

7. The apparatus of claim 5, wherein the apparatus includes a frame, and means forming a grinding station including a grinding wheel mounted on said frame, said frame includes an elongate bar projecting from the grinding station outwardly from the grinding station, the apparatus further including a bracket assembly adjustably mounted on said bar, said saw-mounting means and said support structure being mounted on said bracket assembly.

8. The apparatus of claim 7, wherein said second powered means comprises a fluid-operated ram, the apparatus further including an arm joined to the bracket assembly extending from the bracket assembly, said ram having one end mounted on said arm and an opposite end connected to said support structure.

9. Grinding apparatus comprising a frame, means including a grinding wheel forming a grinding station mounted on said frame, said frame including an elongate bar projecting from the grinding station outwardly from the grinding station, a bracket assembly adjustably mounted on said bar for adjustable movement along the length thereof and toward and away from the grinding station, saw-mounting means mounted on said bracket assembly for rotatably mounting a saw for rotation about an axis coinciding with the axis of the saw, support structure rotatably mounted on said bracket assembly for rotation about said axis, a first fluid-operated ram having one end mounted on said support structure, a compressible pad mounted on an extensible end of said ram disposed adjacent an edge of a saw mounted on said saw-mounting means, the ram being positioned so that on extension of the ram sais pad moves radially of the saw against the edge of the saw, an arm joined to the bracket assembly, and a second fluid-operated ram interposed between and end of said arm and said support structure operable on extension and contraction of the ram to produce rotary movement of the support structure.

10. The apparatus of claim 9, wherein said mounting for said one end of the ram is adjustably mounted on said support structure.

* * * * *